Nov. 4, 1924.
H. F. ANDERSON
GLASS ROLLING PALLET
Filed Feb. 5, 1923
1,513,731
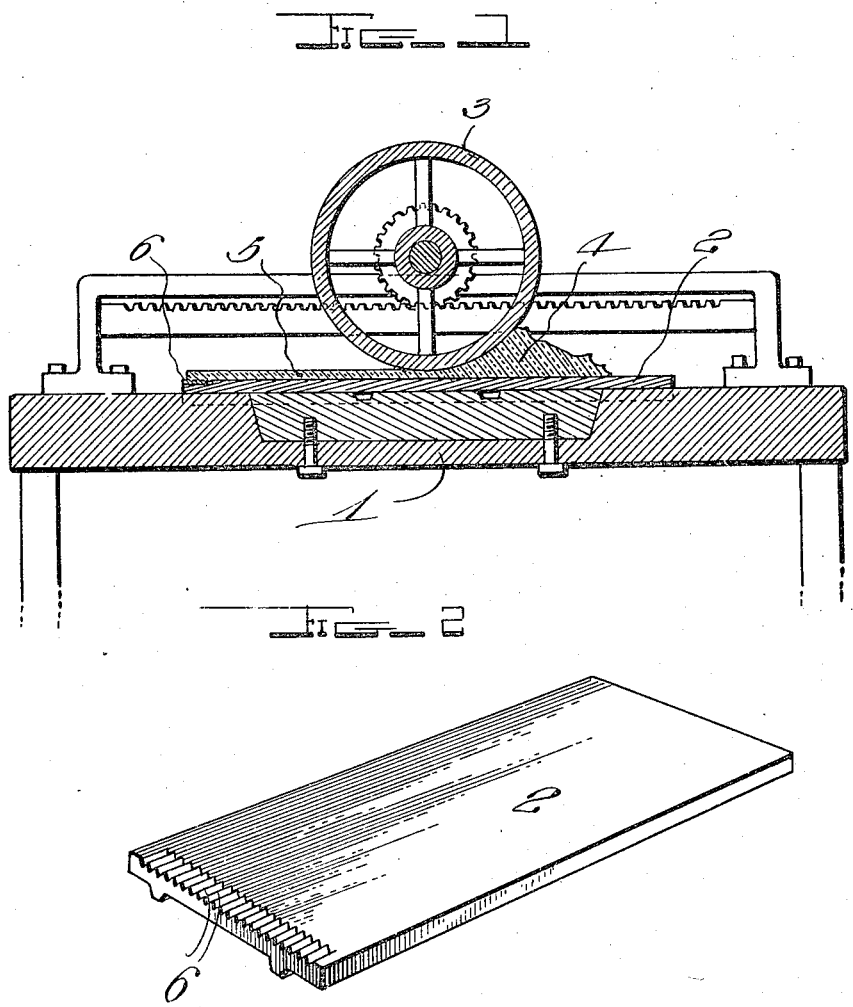
Inventor
Harry F. Anderson
Witness
By
Attorneys Patented Nov. 4, 1924.

1,513,731

UNITED STATES PATENT OFFICE.

HARRY F. ANDERSON, OF MARION, INDIANA.

GLASS-ROLLING PALLET.

Application filed February 5, 1923. Serial No. 617,129.

*To all whom it may concern:*

Be it known that I, HARRY F. ANDERSON, a citizen of the United States, residing at Marion, in the county of Grant and State of Indiana, have invented certain new and useful Improvements in Glass-Rolling Pallets; and I do declare the following to be a full, clear, and exact description of the invention, such as will enable others skilled in the art to which it appertains to make and use the same.

In the art of glass rolling, when sheets of glass are rolled onto a pallet, they often creep upon the latter as the roller advances over the soft mass of glass. It is the object of my invention however to provide a glass rolling pallet having means at one end for holding the sheet against creeping.

With the foregoing in view, the invention resides in the novel subject matter hereinafter described and claimed, the description being supplemented by the accompanying drawing.

Figure 1 is a longitudinal sectional view showing the use of the improved glass rolling pallet.

Figure 2 is a perspective view of the pallet.

In the drawing above briefly described, I have shown a portion of a glass rolling machine in order to illustrate the application of my invention, said machine including a suitable support 1 for the pallet 2 and an appropriately guided roller 3 for rolling a mass 4 of soft glass onto said pallet.

For the purpose of causing the rolled sheet of glass 5 to cling to the pallet 2, I have provided one end of this pallet with a plurality of closely spaced longitudinal grooves 6 into which the glass is pressed by the roller 3, when the rolling operation is begun. By roughening the pallet in this manner or providing a portion of its surface with an anchoring field, the newly rolled sheet of glass is held against creeping upon the pallet during the rolling operation.

As excellent results may be obtained from the details disclosed, they may be followed if desired, but within the scope of the invention as claimed, numerous minor changes may be made.

I claim:

1. A glass rolling pallet roughened at one end to prevent creeping of the glass thereon when the latter is being rolled into a sheet.

2. A glass rolling pallet provided at one end with a plurality of recesses into which the glass is forced at the beginning of the rolling operation, whereby to prevent creeping of the glass upon the pallet as it is rolled into sheet form.

3. A glass rolling pallet having at one end a plurality of longitudinal grooves disposed in closely spaced relation for receiving a portion of the glass when the latter is rolled onto the pallet, thereby preventing creeping of the sheet of glass as it is rolled onto the pallet.

4. A pallet upon which glass is rolled into sheet form, having a portion of its surface provided with an anchoring field to which the glass will cling when pressed into engagement therewith during the rolling operation, whereby to prevent the glass from creeping along the pallet during the rolling operation.

In testimony whereof I have hereunto affixed my signature.

HARRY F. ANDERSON.